(12) United States Patent
Beri

(10) Patent No.: US 8,783,428 B2
(45) Date of Patent: Jul. 22, 2014

(54) BRAKE SHOE AND BRAKE LINING BLOCKS WITH KEYED CONNECTION

(76) Inventor: Michael Beri, North York (CA)

( * ) Notice: Subject to any disclaimer, the term of this patent is extended or adjusted under 35 U.S.C. 154(b) by 2463 days.

(21) Appl. No.: 10/595,350

(22) PCT Filed: Oct. 12, 2004

(86) PCT No.: PCT/IB2004/003329
§ 371 (c)(1),
(2), (4) Date: Apr. 12, 2006

(87) PCT Pub. No.: WO2005/035328
PCT Pub. Date: Apr. 21, 2005

(65) Prior Publication Data
US 2007/0051572 A1 Mar. 8, 2007

Related U.S. Application Data

(63) Continuation-in-part of application No. 10/684,877, filed on Oct. 13, 2003, now Pat. No. 6,983,831.

(60) Provisional application No. 60/513,085, filed on Oct. 21, 2003.

(51) Int. Cl.
*F16D 65/04* (2006.01)
*F16D 65/00* (2006.01)

(52) U.S. Cl.
USPC .................. 188/250 G; 188/234; 188/250 B

(58) Field of Classification Search
USPC ... 188/234, 235, 250 G, 250 B, 250 E, 250 D
See application file for complete search history.

(56) References Cited

U.S. PATENT DOCUMENTS

| 707,232 | A | | 8/1902 | House, Jr. | |
|---|---|---|---|---|---|
| 1,682,319 | A | | 8/1928 | Bluhm | |
| 1,772,639 | A | * | 8/1930 | Slade | 188/234 |
| 1,781,074 | A | | 11/1930 | Nortron | |
| 1,934,448 | A | * | 11/1933 | Roth | 188/234 |
| 1,937,140 | A | | 11/1933 | Blume | |
| 2,053,939 | A | * | 9/1936 | Barrows | 213/7 |

(Continued)

FOREIGN PATENT DOCUMENTS

| CA | 948130 | 5/1974 |
|---|---|---|
| CN | 200480034670x | 10/2004 |

(Continued)

OTHER PUBLICATIONS

Brakepro Heavy Duty Presents . . . The Integrablok Advantage, pp. 1-8.

*Primary Examiner* — Melody Burch
(74) *Attorney, Agent, or Firm* — Brooks Kushman P.C.

(57) ABSTRACT

A brake shoe assembly comprising a brake shoe to which brake plates are assembled. The brake shoe and brake plates are connected by a key or tang in one to a key way or slot in the other. Preassembled fasteners are provided on the brake plates to facilitate alignment of the brake plates with the brake shoe so that the key is received in the slot. Fasteners may be provided in four open corner areas so that the brake plate may be secured to the brake shoe with metal-to-metal contact where the brake plate is secured to the brake shoe. A brake shoe having a cylindrical outer surface or an outer surface defined by a plurality of flats is provided.

18 Claims, 5 Drawing Sheets

(56) References Cited

U.S. PATENT DOCUMENTS

| | | | |
|---|---|---|---|
| 2,067,677 A | 1/1937 | Murphy | |
| 2,164,015 A | 6/1939 | Kateley | |
| 2,480,947 A | 9/1949 | McEachran | |
| 2,541,978 A | 2/1951 | Amundsen | |
| 2,879,866 A | 3/1959 | Newell | |
| 3,467,229 A | 9/1969 | Deibel | |
| 3,891,069 A | 6/1975 | Lawrence | |
| 3,996,717 A * | 12/1976 | Sallenave et al. | 52/742.16 |
| 4,453,621 A | 6/1984 | Warwick et al. | |
| 4,501,347 A | 2/1985 | Cerny et al. | |
| 4,569,424 A | 2/1986 | Taylor, Jr. | |
| 4,588,050 A | 5/1986 | Urban | |
| 4,646,885 A | 3/1987 | Giardini | |
| 4,771,870 A | 9/1988 | Belk | |
| 5,119,909 A | 6/1992 | Shim | |
| 5,139,114 A | 8/1992 | Rodriguez et al. | |
| 5,255,762 A | 10/1993 | Beri | |
| 5,429,215 A | 7/1995 | King | |
| 5,469,942 A | 11/1995 | Krumm, Sr. | |
| 5,636,717 A | 6/1997 | Cardenas | |
| 5,839,550 A | 11/1998 | Redgrave et al. | |
| 5,941,349 A | 8/1999 | Krumm, Sr. | |
| 5,975,255 A | 11/1999 | Monroe et al. | |
| 6,125,567 A * | 10/2000 | Roy | 40/790 |
| 6,300,847 B1 * | 10/2001 | Gallagher et al. | 333/33 |
| 6,520,301 B2 | 2/2003 | Young | |
| 6,983,831 B2 | 1/2006 | Beri | |
| 2002/0023808 A1 | 2/2002 | Krumm, Sr. | |
| 2002/0121412 A1 | 9/2002 | Young | |

FOREIGN PATENT DOCUMENTS

| | | |
|---|---|---|
| GB | 2073834 A | 10/1981 |
| GB | 2087995 A | 6/1982 |
| WO | 2005035328 A3 | 4/2005 |

\* cited by examiner

BRAKE SHOE AND BRAKE LINING BLOCKS WITH KEYED CONNECTION

CROSS-REFERENCE TO RELATED APPLICATIONS

This application is a continuation-in-part of U.S. application Ser. No. 10/684,877 filed Oct. 13, 2003 which is now issued as U.S. Pat. No. 6,983,831. This application also claims the benefit of provisional application 60/513,085 filed Oct. 21, 2004.

BACKGROUND OF THE INVENTION

1. Field of the Invention

The present invention relates to drum brake shoes and brake lining blocks for vehicles such as trucks or buses.

2. Background Art

Vehicle brakes are generally either disk brakes or drum brakes. Drum brakes are generally preferred for buses and commercial trucks because drum brakes may provide a greater surface area of friction material. The braking surface of the friction material is generally riveted to a backing plate of a brake block. Generally, 12 to 16 rivets are required to attach a brake block to a brake shoe due to the substantial shear forces that must be withstood during braking between the brake blocks and the brake shoe.

Commercial and industrial vehicle brake linings that are riveted to steel brake shoes are generally rigid, non-asbestos friction material. If the outer diameter of the brake shoe surface that is to be retrofit with new brake linings is not completely flat or within original design radius tolerances, the lining after securing to the shoe may crack or break off of the brake shoe. This may create problems relating to braking performance and durability.

The paramount consideration for brake design is safety. Worn or damaged brakes can cause reduced braking performance that may result in longer stopping distances. If a brake lining becomes dislodged in whole or in part, the brake for a wheel can jam or lock-up and could result in a truck jack knifing.

Rivet holes in friction material interrupt the smooth surface of the friction material and reduce the available braking surface. Reduction of the braking surface can increase temperature stress on the friction material. Corners of the friction material can be damaged during assembly or in use and heat stress at the corners can lead to fractures.

The shear forces developed between the friction material and a backing plate or brake shoe must be withstood by the bond between the friction material and the surface to which it is secured. Shear forces between the surface of a backing plate and a brake shoe must be withstood by the fasteners that secure the brake plate that includes a backing plate to the brake shoe. If a brake plate or part of the friction lining material becomes detached from the brake shoe in an emergency, the brake assembly could lock-up or be otherwise seriously compromised.

The friction material used on brake blocks is drilled and countersunk to receive rivets that are used to connect the brake block to the brake shoe. Holes are formed in the friction material by either a drilling or a punch operation. If the counter bore is not drilled deep enough, the brake block may crack when riveted to the to the brake shoe by a riveter. If the counter bore is drilled too deep, the brake block may be only loosely fastened. This condition can lead to cracking of the friction material or other problems.

If the rivet tool misses a rivet location and contacts the friction material, it may harm the friction material. The friction material may be cracked, broken, or deformed if the rivet is misdirected, or improperly set-up for depth and rivet application force. Any cracking, breakage or deformation could adversely impact braking performance of the lined brake shoe when installed on a vehicle.

Substantial labor costs are incurred to rivet brake blocks to a brake shoe. Additional expenses may be incurred if it is necessary to scrap a cracked brake block.

The surface area of the friction material is reduced by each access hole in the friction material required for a rivet. Any reduction in surface area of the friction material may adversely affect stopping performance. Holes for rivets in the surface of the friction material may result in unwanted noise especially if dirt or other foreign material is permitted to collect in the rivet access holes.

In the manufacture of brake blocks, problems may be encountered including blistering at the corners of the brake blocks. The corners of brake blocks may be broken or damaged especially if the corners are formed with right angle corners.

There is a need for an improved brake shoe having brake blocks that maximize the friction material surface area while minimizing riveting operations. There is also a need to eliminate the potential for damage to friction material on brake blocks when they are assembled to a brake shoe.

There is also a need in some applications to eliminate riveting operations in the assembly of brake blocks to brake shoes. Some repair facilities prefer to avoid such riveting operations and instead install brake blocks using only conventional threaded fastening tools.

Conventional brake blocks for conventional drum brakes have a partial cylindrical backing plate that is mated to the partial cylindrical surface of the brake shoe. Rivets secure the brake blocks to the brake shoe and are the sole mechanism for resisting sheer forces between the brake blocks and the brake shoe when the brake engages the brake drum. Sheer forces develop as the brake shoe is pressed against the drum because brake drum rotation is slowed by contact with the friction material of the brake blocks.

When a brake is used in reverse, the rotational forces applied to the brake blocks are reversed. If the brakes are frequently used in reverse or if the brakes are applied in an emergency stop while the vehicle is moving in reverse, the rivets may distort or stretch rivet holes in the friction material. If the rivets holes become enlarged the friction material may become loose. Any looseness of the rivets relative to the friction material may create unwanted noise or improper brake feel.

With current drum brake shoes, when the lining is worn to a point beyond the recommended extent, as much as 95% of the steel shoe may contact the brake drum. When brake shoes are rebuilt and reinstalled in a vehicle, the first brake application may result in only 40% to 50% of the surface of the friction material actually contacting the brake drum. In a short period of time, of over 3 or 4 days or possibly 50 to 100 brake applications, the friction material may wear until 75%-80% of the friction material surface contacts the brake drum. Braking performance is improved as the proportion of friction material surface contacting the brake drum increases.

There is a need for an improved brake shoe having brake blocks that have improved resistance to sheer forces, reduced manufacturing costs, reduced friction material waste, reduced break-in period, and that provide maximum friction material surface contact even when the friction material is worn to the maximum extent. There is also a need for brake shoes having brake blocks that are designed to minimize noise and vibration.

Applicant's invention is directed to solving the above problems as summarized below.

SUMMARY OF THE INVENTION

According to one aspect of the present invention, a brake shoe assembly is provided that includes a brake shoe and a brake plate. The brake shoe has an outer radial surface. The brake plate is secured to the outer radial surface of the brake shoe. A slot and an integrally formed key are provided between the brake shoe and brake plate. The slot and key prevent radial movement of the brake plate relative to the outer radial surface of the brake shoe. The slot and key also greatly increase resistance to shear forces when the brake is applied in comparison to conventional rivet secured brake linings. A plurality of fasteners, such as rivets or clinch bolts, may be provided for securing the brake plate to the brake shoe.

According to another aspect of the present invention, a vehicle brake drum shoe assembly is provided that includes a cylindrical brake shoe and at least one brake plate that is secured to the outer radial surface of the brake shoe. A pair of keys may be integrally formed by a punching operation in each of the cylindrical brake shoes to extend outwardly from the outer radial surface of the brake shoe. The brake plate is secured to the outer surface of the brake shoe and includes a pair of slots for receiving the keys of the brake shoe. The keys of the brake shoe are received in the slots in the brake plate and function to prevent radial movement of the brake plate relative to the outer radial surface of the brake shoe. Alternatively, the keys may be formed in a backing plate of the brake shoe and the slots may be formed in the brake shoe.

Other aspects of the invention relate to preassembling fasteners to the brake plate and providing a pair of alignment holes for receiving the preassembled fasteners that facilitate alignment of the brake shoe keys with brake plate slots. The preassembled fasteners may be longer than the height of the brake shoe key to align the brake shoe key with the brake plate slot. The preassembled fasteners, if rivets, may be secured to the brake shoe by a flaring tool. If the preassembled fasteners are, for example, clinch bolts they may be secured by a self-locking nut, or the like. The friction material of the brake lining is molded over and covers one end of the preassembled fasteners. One brake shoe may receive two brake blocks that each have two slots or key ways, wherein four keys are formed on each brake shoe. The keys are formed or pressed out from the inside of the outer surface of the brake shoe without breaking through the brake shoe. The elongated keys, or ribs, fit tightly within the elongated key ways formed in the backing plates. Alternatively, the keys may be formed on the brake plates and the slots may be provided in the brake shoe.

Other aspects of the invention relates to the concept of forming four recesses at the four corners of the brake plate to expose a corner portion of the brake plate. Fasteners are inserted through the four exposed corner portions to join the brake plate and brake shoe after the preassembled fasteners align the brake shoe key with the brake plate slot. The brake plate may then be secured to the brake shoe to thereby provide metal-to-metal contact and eliminating the need to fasten through the friction material. The brake plate slot is axially elongated to receive the elongated brake shoe keys. The backing plates span the friction lining surface and provide additional strength for the brake linings as they are attached to the brake shoe.

Another approach to eliminating fastening through the friction material is to assemble clinch bolts through a backing plate of a brake plate and then apply the friction material over the backing plate covering the clinch bolts. Keys may also be formed in the backing plates by partially severing and forming a key or tang to extend radially inward of the backing plate. The key or tang may then be received in a slot formed in the brake shoe.

According to another aspect of the present invention, a method of manufacturing a brake assembly is provided. The method begins by providing a brake plate having a plurality of fastener apertures and an alignment slot. Four apertures may be provided at four corners of the brake plate with two intermediate apertures being provided at opposite sides of the brake plate. A set of preassembled fasteners are inserted into the two intermediate apertures of the brake plate. A frictional brake lining is then molded over the preassembled fasteners so that the frictional brake lining covers the preassembled fasteners. A brake shoe having a plurality of apertures that match the apertures in the brake plate also further includes a key that protrudes from the outer radial surface of the brake shoe. Each of the brake plate slots receives a brake shoe key when the brake plate is mated to the brake shoe. The preassembled fasteners are aligned with corresponding holes in the brake shoe to facilitate inserting the brake shoe key into the brake plate slot. Alternatively, the keys and slots could be on the brake plate and brake shoe, respectively. A set of fasteners is inserted in each of the fastener apertures in the corners of the brake plate. The fasteners extend through corresponding holes in both the brake plate and the brake shoe and are secured by a fastener tool in a fastening operation. The preassembled fasteners, if rivets, may be flared to secure the brake plate to the brake shoe. The brake shoe key when inserted in the brake plate slot limits, or prevents, movement of the brake plate relative to the outer radial surface of the brake shoe.

According to other aspects of the invention as they relate to the method of manufacturing a brake assembly, the molding step may be performed without applying a brake lining over portions of the four corners of the brake plate. The open corners of the brake plate expose the four corner fastener apertures to facilitate fastening the brake plate to the brake shoe with metal-to-metal contact. This allows the fastening process to be used without drilling and counterboring the friction material for fastening access. The method may also comprise forming the brake slot as an axially elongated aperture and forming the brake shoe key as an axially elongated key, or rib, that fits within the axially elongated brake slot. The method may further comprise forming a pair of axially elongated slots in the brake plate and forming a corresponding pair of axially elongated keys in the brake shoe for each brake plate. The keys may be formed as integrally formed portions of the brake shoe in a punching or stamping operation. The location of the keys and slots may be reversed on the brake plate and brake shoe, as previously indicated.

According to yet another aspect of the present invention, a brake shoe assembly is provided that includes a brake shoe and a brake plate. The brake shoe has an outer radial surface. The brake plate is secured to the outer radial surface of the brake shoe. At least one hole and an integrally formed cylindrical key are provided between the brake shoe and brake plate. The hole and cylindrical key prevent radial movement of the brake plate relative to the outer radial surface of the brake shoe. A plurality of fasteners are provided for securing the brake plate to the brake shoe. The fasteners may be rivets, clinch bolts or other fasteners.

According to another embodiment of the invention a brake shoe having flat surfaces may be provided to which brake plates having flat backing plates may be attached with rivets or clinch bolts, or studs, that secure the backing plates to the brake shoe. The flat surfaces of the brake shoe resist movement of the brake plates when shear forces are applied to the friction material of the brake plates. In addition, one or more keys or key ways may be provided to secure the backing plates to a brake shoe to provide added resistance to shear forces. The key may be provided in a variety of shapes and types in either the brake shoes or the backing plates of the brake plates. Conversely, the key ways are of complimentary shapes and types and are provided in the facing part to the key supporting part.

These and other aspects of the present invention will be better understood in view of the attached drawings and following detailed description of the illustrated embodiment.

DETAILED DESCRIPTION OF THE PREFERRED EMBODIMENT(S)

Figure 1:
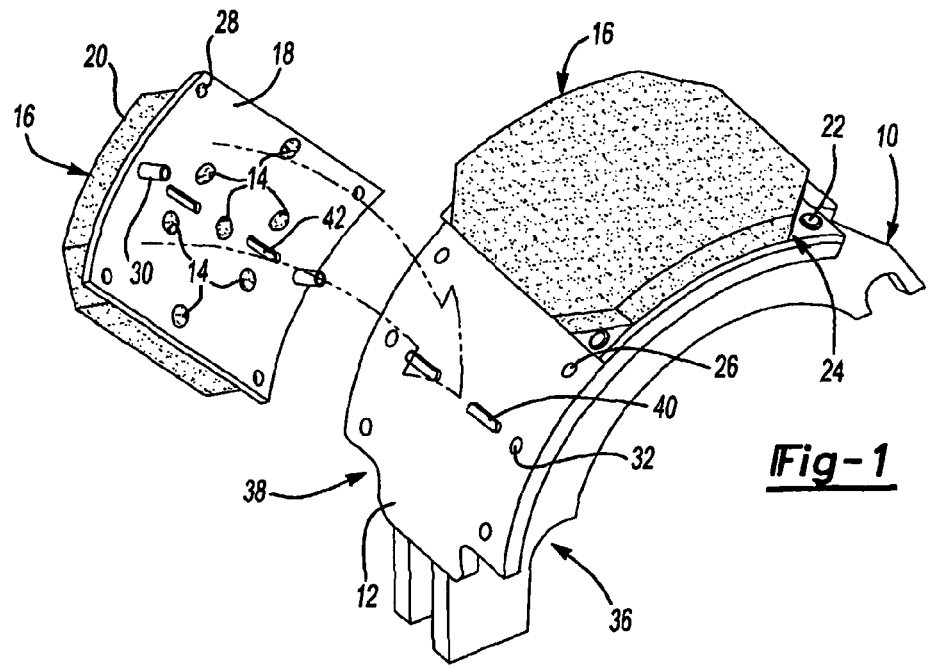
FIG. 1 is an exploded perspective view of a brake shoe with one brake plate secured to the brake shoe and a second brake plate shown as it is assembled to the brake shoe.

Referring to FIG. 1, a brake shoe 10 having a cylindrical outer surface 12 is illustrated with one brake plate 16 assembled to the cylindrical outer surface 12 and a second brake plate 16 that is shown unattached to the brake shoe 10. Each of the brake plates 16 includes a backing plate 18 to which a layer of friction material 20 is bonded. A plurality of apertures 14 are provided in the backing plate 18 into which friction material 20 is integrally molded to mechanically attach the friction material 20 to the backing plate 18.

The brake plates 16 are attached, in part, by fasteners 22 that are secured to the backing plate 18 at open corners 24. While the illustrated embodiment shows rivets 22, other fasteners can be used instead of rivets and references to rivets should be construed to include other types of fasteners as well. The open corners 24 are areas where no friction material 20 is bonded to the backing plate 18. Alternatively, the layer of friction material 20 could be applied over the entire backing plate 18 and then subsequently removed by cutting away or milling the friction material to create the open corners 24. Holes 26 for receiving the fasteners 22 are formed in the brake shoe 10 at spaced locations corresponding to the spacing of the fasteners 22. The brake plates 16 are secured by the fasteners 22 through holes 28 in the backing plate 18 directly to the outer surface 12 of the brake shoe 10 to create a metal-to-metal contact connection.

Preassembled fasteners 30 extend from each of the backing plates 18. The preassembled fasteners 30 are received in alignment pin holes 32 formed in the outer surface 12 of the brake shoe 10. The preassembled fasteners 30 are secured to mounting holes 34, the backing plates 18 and a layer of friction material 20 is molded onto the backing plate 18 covering one end of the preassembled fasteners 30. The fasteners 22 and preassembled fasteners 30 are arranged in rows, as shown, on the inboard side 36 and outboard side 38 of the brake shoe 10. The preassembled fasteners 30 are arcuately spaced from the fasteners 22 that are inserted through holes 28 in the open corners 24 of the brake plate 16.

Keys 40 are formed in the brake shoe 10 to extend outwardly from the cylindrical outer surface 12. The keys 40 are preferably elongated in shape and extend lengthwise in an axial direction. Two keys 40 may be arranged, as shown, in axial alignment on the outer surface 12 of the brake shoe 10. The keys 40 are received in slots 42 formed in the backing plate 18 of the brake plates 16. The integrally formed keys 40 when received in the slots 42 provide a positive and effective part of the attachment system that can withstand substantial shear forces that are created when the brake shoe engages a brake drum (not shown) to stop a vehicle (not shown).

Figure 2:
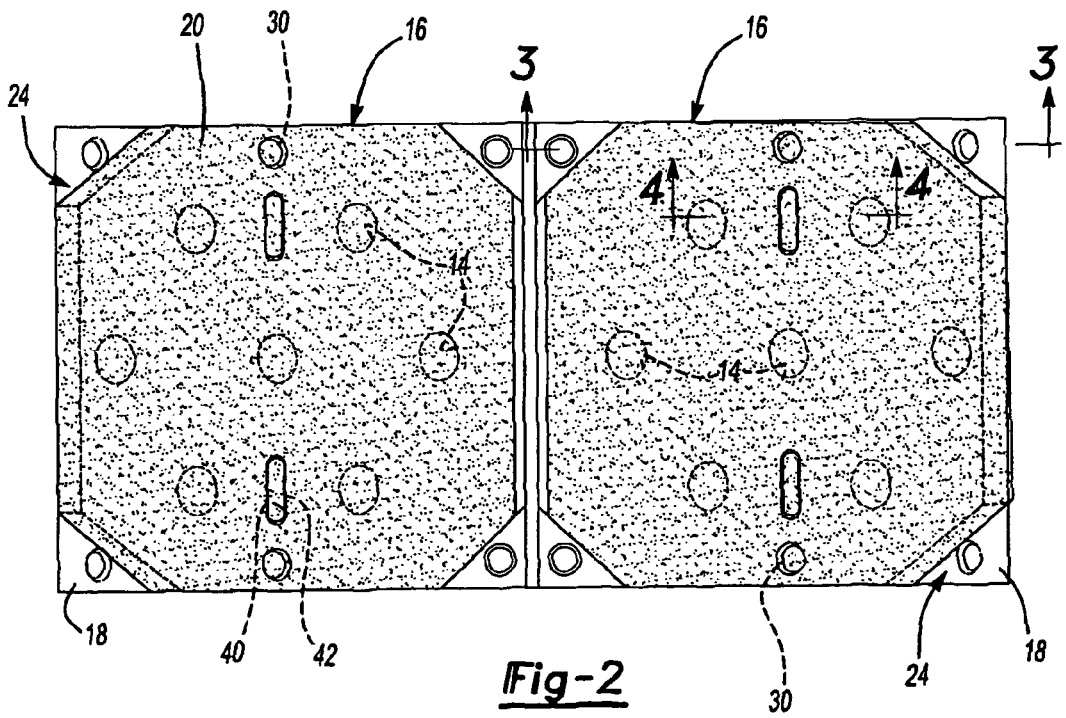
FIG. 2 is an elevation view of a brake shoe and two brake plates.

Referring to FIG. 2, the construction of the brake plates is shown in greater detail. Each brake plate 16 has a backing plate 18 onto which a layer of friction material 20 is bonded. The open corners 24 of each brake plate 16 each reveal a part of the backing plate 18. A layer of friction material 20 is molded over the preassembled fasteners 30 to provide a continuous layer of friction material 20 that is not interrupted by a plurality of fastening holes as was provided with conventional brake plates. The preassembled fasteners 30, as illustrated, may be axially aligned with the keys 40 and slots 42.

Figure 3:
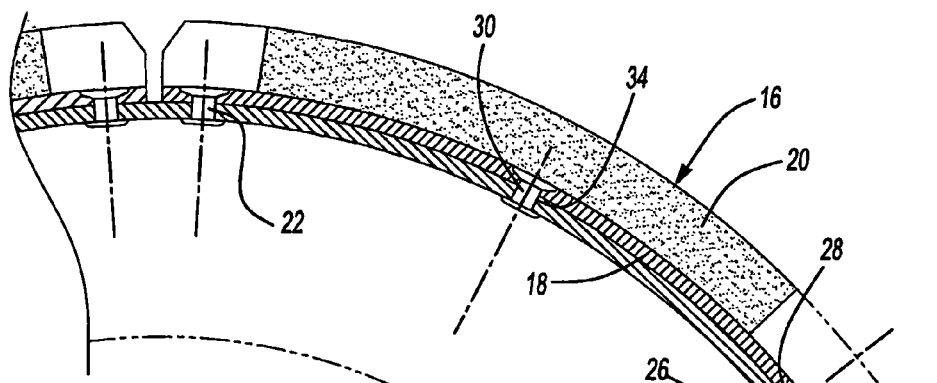
FIG. 3 is a cross-section taken along the line 3-3 in FIG. 2.

Referring to FIG. 3, connection of the brake plates 16 to the brake shoe 10 by means of the fasteners 22 and preassembled fasteners 30 is shown. Fasteners 22 are flared in a riveting operation after insertion through the fastener receiving holes 26 and holes 28 formed in backing plates 18. The preassembled fasteners 30 are assembled to the backing plate 18 before the layer of friction material 20 is applied to the backing plate 18. After the brake plate 16 is assembled to the brake shoe 10, a flaring tool is used to flare the end of the preassembled fasteners 30 forming a rivet-like connection between the brake plate 16 and brake shoe 10.

Figure 4:
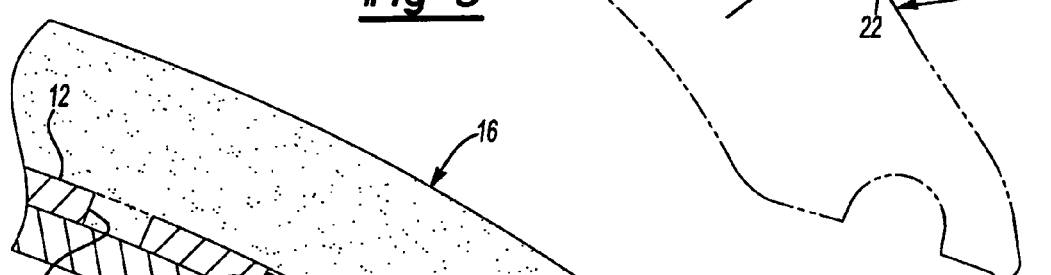
FIG. 4 is a cross-section taken along the line 44 in FIG. 2.

Referring to FIG. 4, a cross section of the connection between the key 40 of the brake shoe 10 and slot 42 in the backing plate 18 of the brake plate 16 is shown. The key 40 may be formed by a sheet metal forming process wherein a punch engages the brake shoe 10 to force the key 40 to extend outwardly from the outer surface 12 of the brake shoe 10 without separating the key 40 from the brake shoe 10.

Figure 4A:
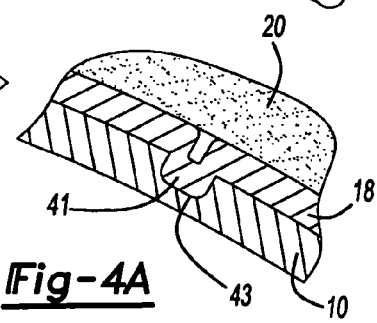
FIG. 4A is a cross-section showing an alternative orientation for the slot and key shown in FIG. 4.

Referring to FIG. 4A, a cross-section of an alternative connection between key 41 and a slot 43 is illustrated that may be adapted to any of the disclosed embodiments or methods. This alternative design shows a cross-section of the key 41 formed in the backing plate 18 rather than in the brake shoe 10 and the slot 43 created in the brake shoe 10 rather than the backing plate 18. This design allows the use of conventional brake plates because there is no protruding key on the brake shoe.

Figure 5:
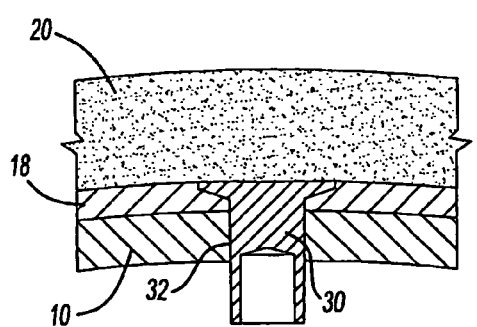
FIG. 5 is a cross-sectional view of a preassembled rivet in a brake plate inserted through a hole in the brake shoe.
Figure 6:
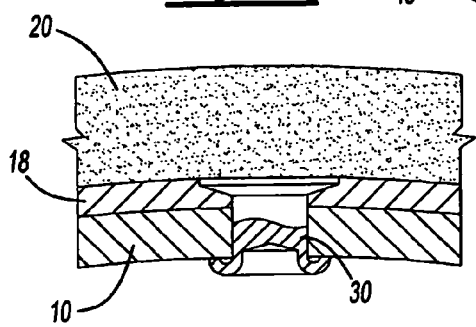
FIG. 6 is a cross-sectional view showing the preassembled rivet flared to secure the brake plate to the brake shoe.

Referring to FIG. 5, one of the preassembled fasteners 30 is shown inserted into one of the alignment pin holes 32. The preassembled fasteners 30 orient the slots 42 relative to the keys 40 and also align the fastener receiving holes 26 on the brake shoe 10 with the holes 28 formed in the open corners 24 of the backing plate 18. As shown in FIG. 6, the alignment pin 30 has been flared by a flaring tool to firmly secure the brake plate 16 to the brake shoe 10.

The method of manufacturing the brake shoe 10 having replaceable brake plates 16 is described below. While the embodiment illustrated in FIGS. 1-6 shows rivets, it should be understood that specific references to fasteners and fastener holes include but are not limited to rivets and rivet holes. The method begins by providing a brake plate 16 having a plurality of apertures for receiving fasteners and at least one slot 42 for receiving a key 40. Four fastener receiving apertures or holes are provided at the four corners of the backing plate 18 of the brake plate 16. Two preassembled fasteners 30 are inserted into alignment pin holes 32 in the backing plate 18 between the fastener receiving holes 26. A layer of friction material 20 is then molded over the preassembled fasteners 30 so that the friction brake lining 20 covers the outer ends of the preassembled fasteners 30. The brake shoe 10 has fastener holes 26 that are provided to receive fasteners 22 and alignment pin holes 32 for receiving the preassembled fasteners 30. The brake plates 16 have slots 42 for receiving a brake shoe key 40 when the brake plate 16 is mated to the brake shoe 10. Preassembled fasteners 30 are used to align the brake plate 16 with the brake shoe 10 and facilitate insertion of the brake shoe key 40 into the slots 42. Fasteners 22 are inserted into each of the fastener apertures in the four open corners 24 of the brake plate 16. The fasteners 22 extend through corresponding holes 26 and 28 in the brake shoe 10 and brake plate 16, respectively. The fasteners 22 are secured at the open corners 24 by a riveting tool. The preassembled fasteners 30 are flared to secure the brake plate 16 to the brake shoe 10 at a point generally axially aligned with keys 40 and slots 42. If clinch bolts or studs are used they will be secured by nuts. The preassembled fasteners 30 could alternatively be offset from the keys 40 and slots 42. The brake shoe key 40 is inserted in the slot 42 to prevent radial movement of the brake plate 16 relative to the outer radial surface 12 of the brake shoe 10.

The method of assembling brake plate 16 to a brake shoe 10 described above simplifies the manufacture of brake shoes by reducing the number of fasteners required to secure the brake plate 16 to the brake shoe 10. It also eliminates boring and counter boring fastener holes in the friction material. Preassembled fasteners 30 align the keys 40 with the slots 42 while at the same time aligning the holes 28 in the backing plate 18 with the fastener receiving holes 26 in the brake shoe 10. Metal-to-metal contact is provided for the fasteners 22 to secure the brake plate 16 to the brake shoe 10. The open corners 24 provide clearance between the fastener locations and the friction material 20 so that the fastening operation will not crack the layer of friction material 20.

Figure 7:
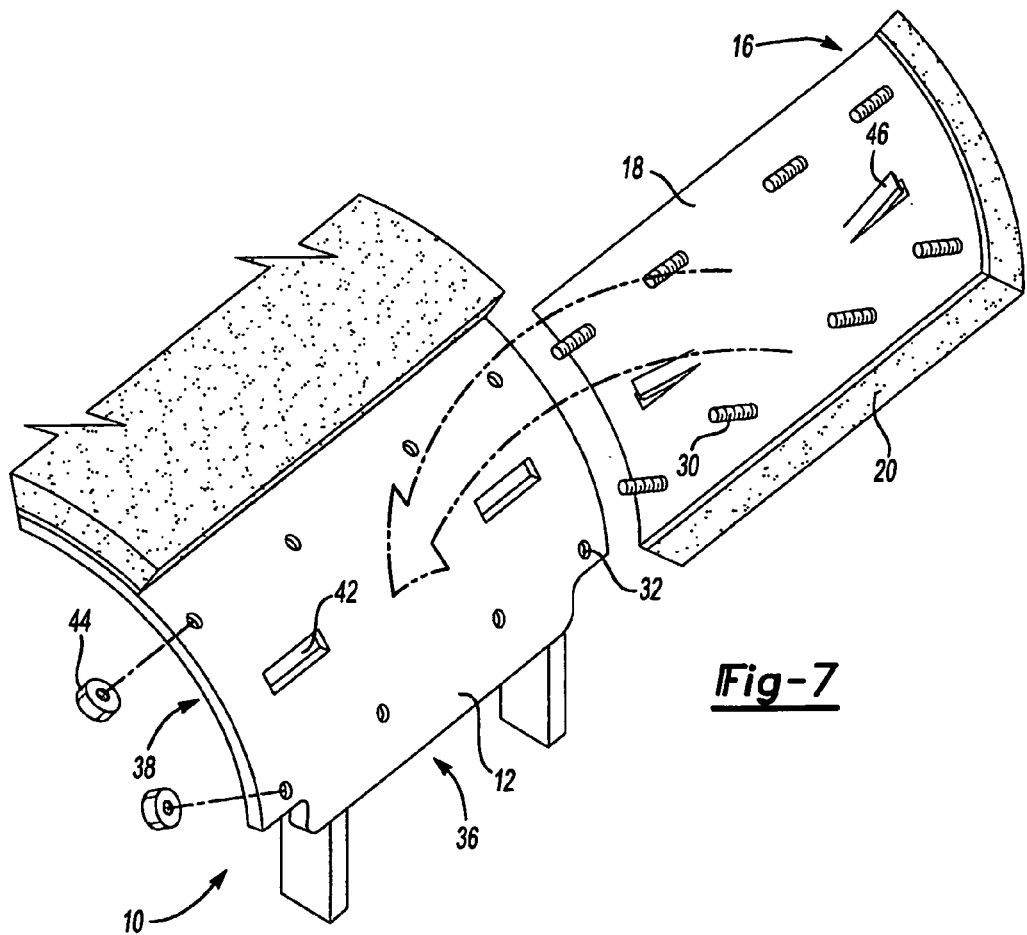
FIG. 7 is an exploded perspective view of a brake shoe with one brake plate secured to the brake shoe and a second brake plate shown as it is assembled to the brake shoe.

Referring to FIG. 7, a brake shoe 10 having a cylindrical outer surface 12 is illustrated with one brake plate 16 that is unattached to the brake shoe 10. The brake plate 16 includes a backing plate 18 to which is bonded a layer of friction material 20. While not illustrated, a plurality of apertures could be provided in the backing plate 18 into which friction material 20 is integrally molded to mechanically attach the friction material 20 to the backing plate 18, like apertures 14 in the embodiment of FIGS. 1-6.

Preassembled fasteners 30, for example clinch bolts or studs, extend from the backing plate 18. The preassembled fasteners are received into alignment pin holes 32 formed in the outer surface 12 of the brake shoe 10. The preassembled fasteners 30 are secured to alignment pin holes 32 by means of stud bolts 44. A layer of friction material 20 is molded onto the backing plate 18 covering the preassembled fasteners 30. The preassembled fasteners 30 are arranged in rows, as shown, on the inboard side 36 and outboard side 38 of the brake shoe 10.

Tabs 46, or locking tangs, are formed in the backing plate 18 of the brake plate 16 and progressively extend inwardly from the cylindrical inner surface of the brake plate 16. The tangs 46 are preferably elongated in shape and extend in an axial direction. The tangs 46 are received in slots 42 formed in the brake shoe 12. The integrally formed tangs 46 when received in the slots 42 provide a positive and effective part of the attachment system that can withstand substantial shear forces that are created when the brake shoe engages a brake drum (not shown) to stop a vehicle (not shown). The recess created when the tab 46 is pressed out from the backing plate 18 may be filled with friction material 20. The friction material 20 behind the tangs 46 aids in mechanically attaching the friction material to the backing plate 18.

Figure 8:
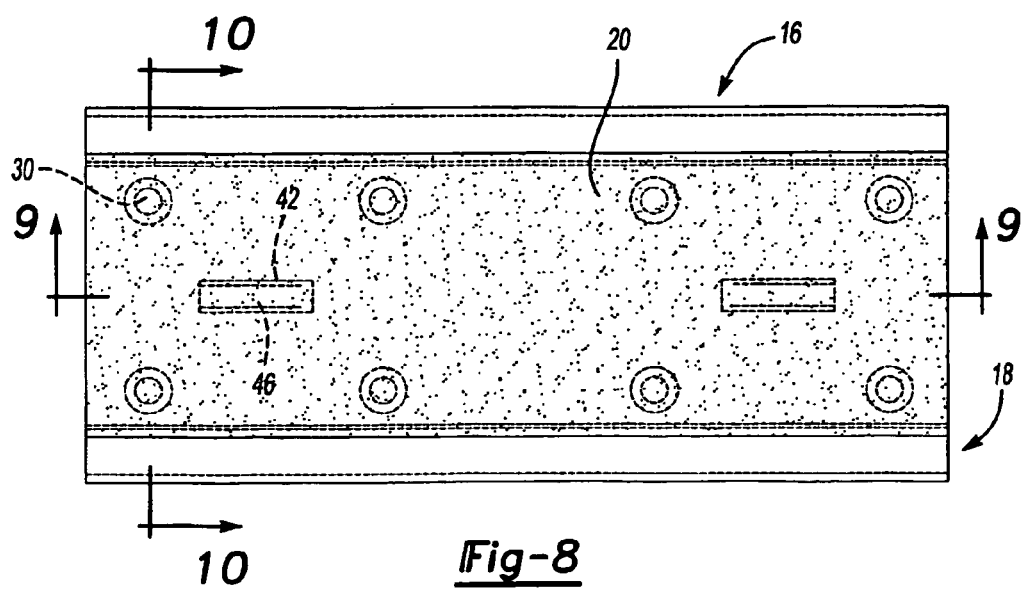
FIG. 8 is an elevation view of the brake shoe and the brake plate of FIG. 7.

Referring to FIG. 8, the construction of the brake plates is shown in greater detail. Each brake plate 16 has a backing plate 18 onto which a layer of friction material 20 is bonded. A layer of the friction material 20 is molded over the preassembled fasteners 30 to provide a continuous layer of friction material 20 that is not interrupted by a plurality of fastening holes as was provided with conventional brake plates. The preassembled fasteners 30, as illustrated, may be axially aligned with the tangs 46 and slots 42.

Figure 9:
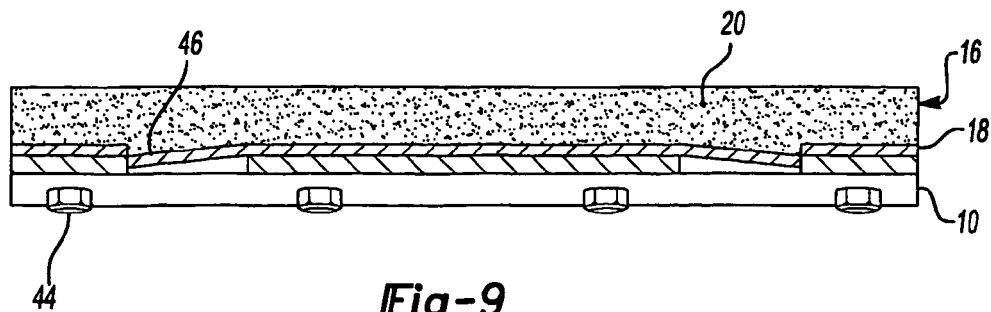
FIG. 9 is a cross-section taken along the line 9-9 in FIG. 8.

Referring to FIG. 9, connection of the brake plate 16 to the brake shoe 10 by means of the preassembled fasteners 30 and tangs 46 is shown. Preassembled fasteners 30 are assembled to the backing plate 18 before the layer of friction material 20 is applied to the backing plate 18. The preassembled fasteners 30 that are illustrated are clinch bolts that are clinched to the backing plate and have a threaded portion that extends inwardly from the backing plate 18. After the brake plate 16 is assembled to the brake shoe 10, the preassembled fasteners 30 are secured by self-locking nuts 44 to connect the brake plate 16 to the brake shoe 10.

Figure 10:
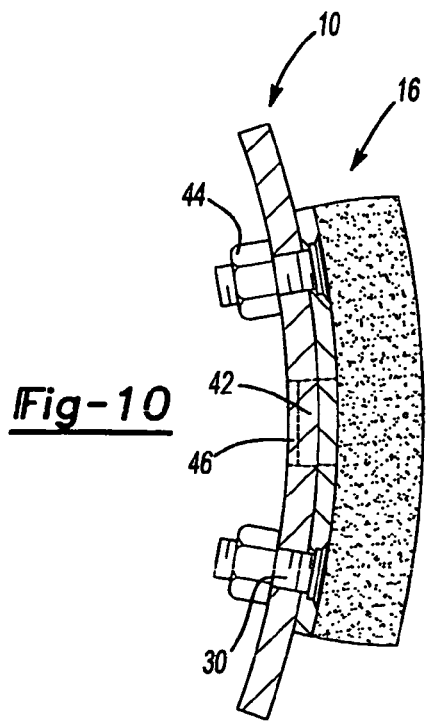
FIG. 10 is a cross-section taken along the line 10-10 in FIG. 8.

Referring to FIG. 10, a cross-section of the connection between the tab 46 and the slot 42 is shown. Additionally, FIG. 10 shows in greater detail the connection of the preassembled fasteners 30 to the stud bolts 44 which maintains the connection between the brake shoe 10 and the brake plate 16.

Figure 11:
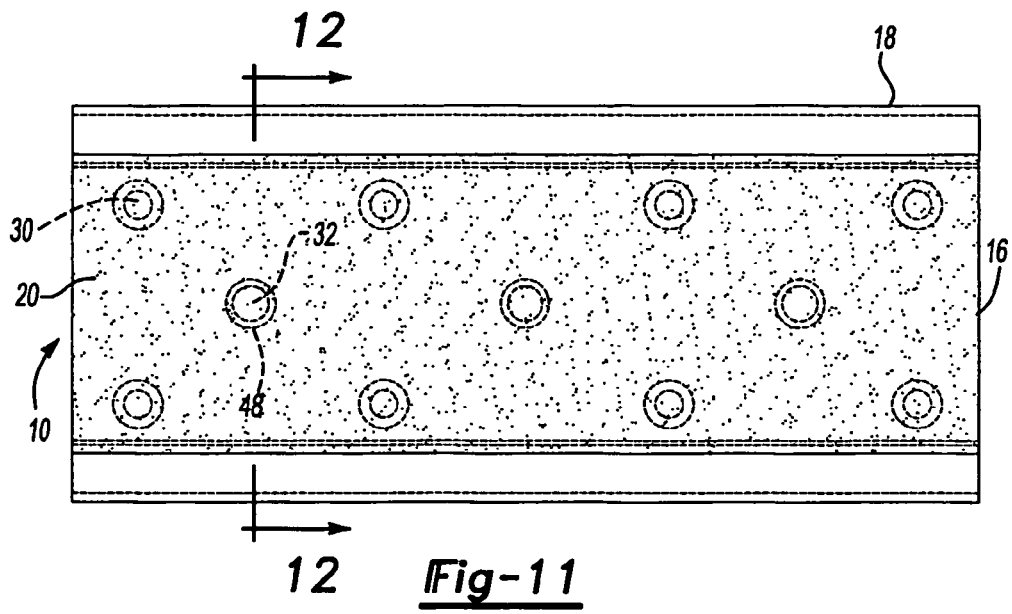
FIG. 11 is an elevation view of a brake shoe and an alternative embodiment of a brake plate.

Referring to FIG. 11, the construction of another brake plate 16 is shown in detail. The brake plate 16 has a backing plate 18 onto which a layer of friction material 20 is bonded. The layer of friction material 20 is molded over the preassembled fasteners 30 to provide a continuous layer of friction material 20 that is not interrupted by a plurality of fastening holes as was provided with conventional brake plates. The preassembled fasteners 30, as illustrated may be axially aligned with one or more cylindrical keys 48. The cylindrical keys 48 are punched into the backing plate 18. The cylindrical keys 48 are received in holes 50 in the brake shoe 10.

Figure 12:
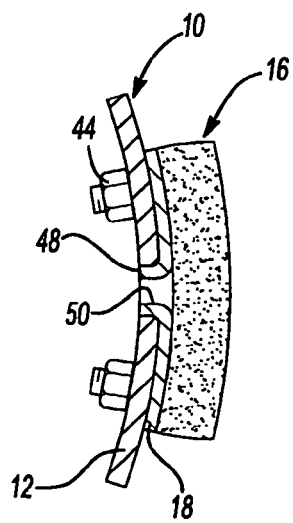
FIG. 12 is a cross-section taken along line 12-12 in FIG. 11

Referring to FIG. 12, is a cross-section of the connection between the cylindrical keys 48 in the backing plate 18 and the holes 28 in the brake shoe 10. FIG. 12 also shows in greater detail how the preassembled fasteners 30 are secured by nuts 44 to connect the brake plate 16 to the brake shoe 10.

Figure 13:
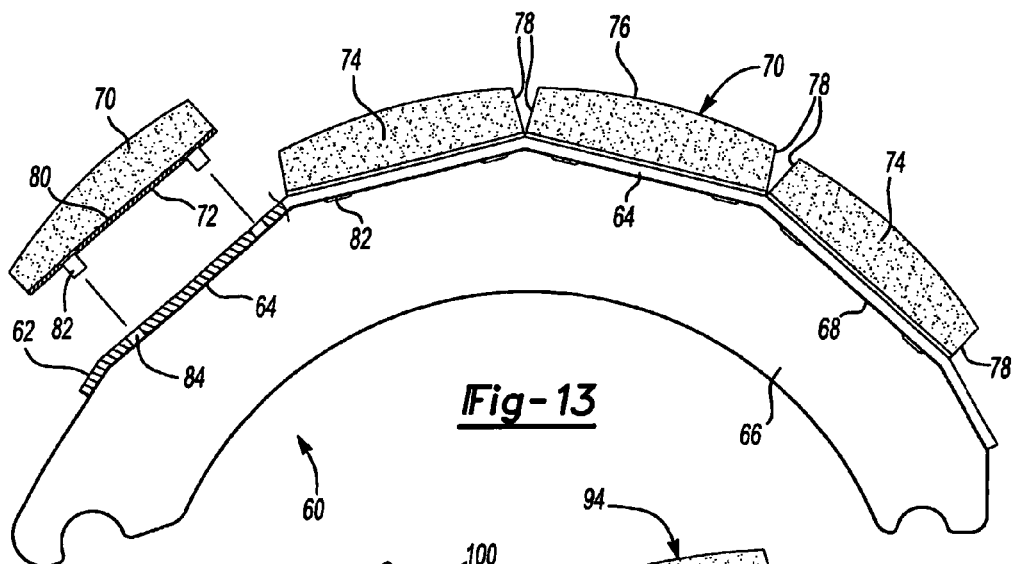
FIG. 13 is a side elevation view of a brake shoe having a plurality of flat sides to which brake blocks including friction material, a backing plate and rivets are secured.

Referring to FIG. 13, a brake shoe 60 is shown to include a wall 62 having a plurality of flat sections 64. The brake shoe 60 also includes a pair of ribs 66 that are welded to one side of the wall 62. Ribs 66 have straight sections 68 onto which the flat sections 64 of the wall 62 are welded.

A plurality of brake blocks 70 are secured to the brake shoe 60. The brake blocks 70 include a flat backing plate 72 and a block of friction material 74. The block of friction material 74 has an arcuate braking surface 76 that is adapted to engage a brake drum (not shown). A pair of side surfaces 78 are provided on opposite sides of the block 74. The side surfaces 78 are slightly canted or tapered to facilitate molding the block of friction material 74. A backing plate bonding surface 80 is provided on the block of friction material 74. A bonding agent may be applied to either the backing plate 72 or bonding surface 80 to facilitate bonding the block of friction material 74 to the backing plate 72.

Rivets 82 are attached to the brake blocks 70 and extend through the backing plates 72 and into holes 84 in the wall 62. Rivets 32 are initially retained on the brake blocks 70 by the friction material 74 that is molded over or bonded to the backing plate 72.

Figure 14:
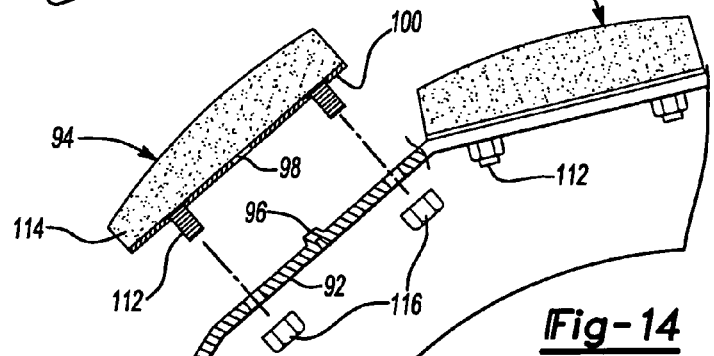
FIG. 14 is a side elevation view of a brake shoe having a plurality of flat sides and having a key to which brake blocks including friction material and a backing plate having a key way are secured with clinch bolts.
Figure 15:
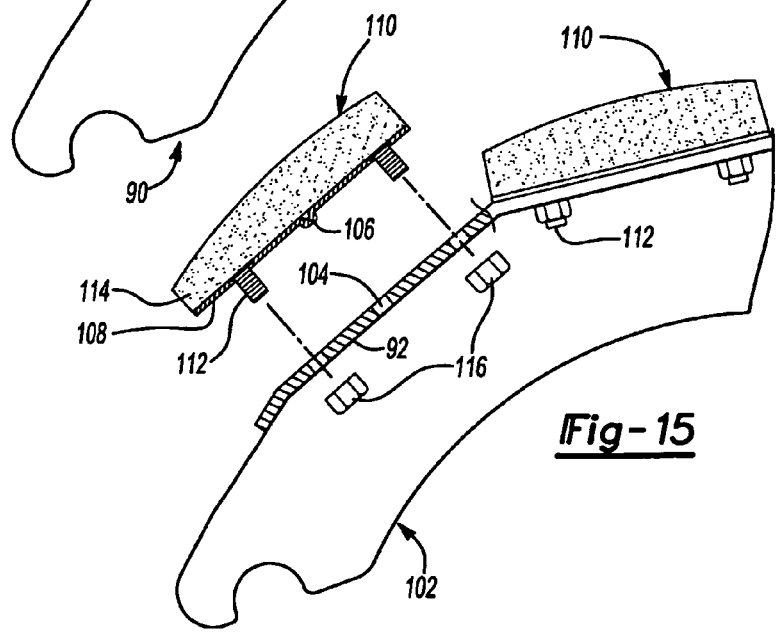
FIG. 15 is a side elevation view of a brake shoe having a plurality of flat sides and having a key way to which brake blocks including friction material and a backing plate having a key are secured with clinch bolts.

Referring to FIGS. 14 and 15, other alternative embodiments are shown that feature brake shoes 90 having flats 92 to which brake plates 94 are secured. In FIG. 14, the brake shoe 90 has a key 96 that is received by a key way 98 formed in the backing plate 100 of the brake plate 94. In FIG. 15, the brake shoe 102 has a key way 104 that receives a key 106 formed on the backing plate 108 of the brake plate 110. In either embodiment, the keys 96, 106 and key ways 98, 104 are complimentary and may be of any of the types previously described with reference to FIGS. 1-12. The brake plates 94, 110 have clinch bolts 112 secured to the backing plates prior to application of the friction material 114. The brake plates 94, 110 are assembled to the brake shoes 90, 102 and secured by self-locking nuts 116.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A brake shoe assembly comprising:
   a brake shoe having an outer radial surface, a plurality of receptacles passing through the outer radial surface, and a plurality of bore holes in the outer radial surface for preassembled fasteners; and
   a brake plate having a cylindrical backing plate and a frictional brake lining, wherein the cylindrical backing plate includes tangs that are partially severed from the backing plate to mate with respective receptacles for resisting movement of the brake plate relative to the outer radial surface of the brake shoe without the tangs passing completely through the brake shoe, and a plurality of preassembled fasteners spaced from the tangs and extending away from the brake lining and toward the brake shoe to facilitate alignment of the tangs with the receptacles, and wherein the frictional brake lining is molded to the backing plate to form a continuous molded layer that covers each of the preassembled fasteners, the brake lining being free of holes extending completely through the continuous molded layer;
   wherein the tangs and the receptacles supplement the preassembled fasteners in securing the brake plate to the brake shoe and particularly resist shear forces between the brake plate and brake shoe.

2. The brake shoe assembly of claim 1 wherein the receptacles pass radially inward through the outer radial surface of the brake shoe.

3. The brake shoe assembly of claim 1 wherein the frictional brake lining is molded at least partially through each tang opening in the backing plate to facilitate attachment of the frictional brake lining to the backing plate.

4. The brake shoe assembly of claim 1 wherein the frictional brake lining is integrally molded into each tang opening in the backing plate to mechanically attach the frictional brake lining to the backing plate.

5. The brake shoe assembly of claim 1 wherein the preassembled fasteners are longer than the tangs to facilitate aligning the tangs relative to the receptacles prior to the receptacles receiving the tangs.

6. The brake shoe assembly of claim 1 wherein the tangs are rectangular tangs and the receptacles are rectangular receptacles to receive the rectangular tangs.

7. The brake shoe assembly of claim 1 wherein the tangs mate with the receptacles to transfer a substantial shear force from the backing plate to the brake shoe when a brake drum in a vehicle applies the substantial shear force to the brake plate.

8. The brake shoe assembly of claim 1 wherein punching the backing plate forms the tangs as part of the brake plate.

9. The brake shoe assembly of claim 1 wherein the preassembled fasteners are threaded clinch stud bolts.

10. A brake shoe assembly comprising:
    a brake shoe having an outer radial surface, a plurality of receptacles passing through the outer radial surface, and a plurality of bore holes in the outer radial surface for preassembled fasteners; and
    a brake plate having a cylindrical backing plate and a frictional brake lining, wherein the cylindrical backing plate includes projections having edges extending away from the backing plate to mate with respective receptacles for resisting movement of the brake plate relative to the outer radial surface of the brake shoe without the projections passing beyond the receptacles in the brake shoe, and a plurality of preassembled fasteners spaced from the projections and extending away from the brake lining and toward the brake shoe to facilitate alignment of the projections with the receptacles, and wherein the frictional brake lining is molded to the backing plate to form a continuous molded layer that covers each of the preassembled fasteners, the brake lining being free of holes extending completely through the continuous molded layer;
    wherein the projections and the receptacles supplement the preassembled fasteners in securing the brake plate to the brake shoe and particularly resist shear forces between the brake plate and brake shoe.

11. The brake shoe assembly of claim 10 wherein the receptacles pass radially inward through the outer radial surface of the brake shoe.

12. The brake shoe assembly of claim 10 wherein the frictional brake lining is molded at least partially through each projection opening in the backing plate to facilitate attachment of the frictional brake lining to the backing plate.

13. The brake shoe assembly of claim 10 wherein the frictional brake lining is integrally molded into each projection opening in the backing plate to mechanically attach the frictional brake lining to the backing plate.

14. The brake shoe assembly of claim 10 wherein the preassembled fasteners are longer than the projections to facilitate aligning the projections relative to the receptacles prior to the receptacles receiving the projections.

15. The brake shoe assembly of claim 10 wherein the projections are rectangular tangs and the receptacles are rectangular receptacles to receive the rectangular tangs.

16. The brake shoe assembly of claim 10 wherein the projections mate with the receptacles to transfer a substantial shear force from the backing plate to the brake shoe when a brake drum in a vehicle applies the substantial shear force to the brake plate.

17. The brake shoe assembly of claim 10 wherein punching the backing plate forms the projections as part of the brake plate.

18. The brake shoe assembly of claim 10 wherein the preassembled fasteners are threaded clinch stud bolts.

\* \* \* \* \*